United States Patent [19]

Panandiker et al.

[11] Patent Number: 5,338,479
[45] Date of Patent: Aug. 16, 1994

[54] BLOCKED ISOCYANATE BLEND HAVING A HIGH ISOCYANATE CONTENT

[75] Inventors: Kam P. Panandiker, Shorewood; Morris R. Olson, Minnetonka, both of Minn.

[73] Assignee: Cargill, Incorporated, Minneapolis, Minn.

[21] Appl. No.: 966,602

[22] Filed: Oct. 26, 1992

Related U.S. Application Data

[63] Continuation of Ser. No. 654,212, Feb. 12, 1991, abandoned.

[51] Int. Cl.$^5$ ............ C09K 3/00; C09D 167/00
[52] U.S. Cl. ............ 252/183.71; 252/182.21
[58] Field of Search ............ 252/182.21; 528/45

[56] References Cited

U.S. PATENT DOCUMENTS

| | | | |
|---|---|---|---|
| 3,836,491 | 9/1974 | Taft et al. | 525/440 |
| 3,954,900 | 5/1976 | Schmalz et al. | 525/440 |
| 3,991,034 | 11/1976 | Takeo et al. | 525/440 |
| 4,066,579 | 1/1978 | Yukuta et al. | 521/111 |
| 4,151,152 | 4/1979 | Schmitt et al. | 524/484 |
| 4,317,894 | 3/1982 | Lewarchik et al. | 525/411 |
| 4,338,412 | 7/1982 | von Bonin | 521/157 |
| 4,352,924 | 10/1982 | Wooten et al. | 528/302 |
| 4,480,008 | 10/1984 | Farronato et al. | 428/425.8 |
| 4,540,766 | 8/1985 | Chang et al. | 528/45 |
| 4,543,405 | 9/1985 | Ambrose et al. | 528/78 |
| 4,636,424 | 6/1987 | Amemiya et al. | 428/286 |
| 4,649,067 | 3/1987 | Gras | 427/388.2 |
| 4,742,089 | 3/1988 | Naka et al. | 521/110 |
| 4,748,200 | 5/1988 | Nasu | 524/591 |
| 4,761,465 | 8/1988 | Speranza et al. | 528/45 |
| 4,762,901 | 8/1988 | Dhein et al. | 528/73 |
| 4,781,808 | 11/1988 | Geist et al. | 523/409 |
| 4,824,925 | 4/1989 | Kamarchik, Jr. et al. | 528/45 |
| 4,859,760 | 8/1989 | Light, Jr. et al. | 528/45 |
| 4,935,485 | 6/1990 | Pedain et al. | 528/45 |
| 4,945,149 | 7/1990 | Matsumoto et al. | 528/63 |
| 5,028,682 | 7/1991 | Witzeman et al. | 528/45 |
| 5,143,994 | 9/1992 | Lass et al. | 528/45 |

*Primary Examiner*—Kight, III: John
*Assistant Examiner*—Jeffrey Culpeper Mullis
*Attorney, Agent, or Firm*—Fitch, Even, Tabin & Flannery

[57] ABSTRACT

A cross-linking agent with a high isocyanate content comprising a blend of diisocyanate and polyisocyanate is described. A method of cross-linking polymeric vehicles having active hydrogens, polymeric vehicles which include the cross-linking agent which includes the blend of di- and polyisocyanates and a method of making the cross-linking agent also are described.

10 Claims, No Drawings

5,338,479

BLOCKED ISOCYANATE BLEND HAVING A HIGH ISOCYANATE CONTENT

This application is a continuation of application Ser. No. 07/654,212 filed Feb. 12, 1991 now abandoned.

FIELD OF THE INVENTION

This invention is directed to cross-linking polymers with an isocyanate cross-linking agent. More particularly this invention is directed to an isocyanate cross-linking agent, a method of cross-linking polymers with the cross-linking agent, a method of making the cross-linking agent and a solvent dispersible polymeric vehicle which includes the isocyanate cross-linking agent which comprises a blend of blocked di- and polyisocyanates.

DESCRIPTION OF THE PRIOR ART

Curable solvent based polymeric vehicles for coating binders which contain blocked isocyanate curing or cross-linking agents have long been known. Capped or blocked isocyanates have the characteristic of providing reactive cross-linking isocyanates at elevated temperatures, but also provide storage stable cross-linking agents at lower temperatures which blocked isocyanate may be mixed or dissolved with polymers with an isocyanate reactive functionality. At elevated temperatures, the isocyanate group is deblocked and made available for reaction with the reactive polymer. Hence, it is possible to produce storage stable mixtures that include polymers containing hydroxyl groups such as polyesters and isocyanates. These mixtures do not react until an elevated deblocking temperature is reached.

Isocyanate cross-linking agents for cross-linking isocyanate reactive polymers generally have been in the form of blocked prepolymers. These prepolymers are the reaction product of a di- or polyisocyanate with a diol or polyol, the prepolymer having a functionality of two or more and which reaction product then is capped or blocked by reacting the free isocyanates of the prepolymer with a blocking agent as are known in the art. U.S. Pat. No. 4,656,211 to Nasu et al. describes cross-linking agents which are blocked prepolymers. These prepolymers include the reaction product of 1,3-bis-(isocyanatomethyl) cyclohexane and trimethylolpropane which polymer is blocked with methyl ethyl ketoxime; 3-isocyanatomethyl-3,5,5-trimethylcyclohexyl isocyanate reacted with trimethylolopropane and blocked with ε-caprolactam. Typically these blocked prepolymers have blocked isocyanate content of about 16% which is available to react with active hydrogens of a polymer to cross-link the polymer. Hence, even though a large portion of the blocked prepolymer is based upon a di- or polyisocyanate, a large portion of the isocyanate content is utilized as urethane prepolymer and not as blocked isocyanate available for reaction with isocyanate reactive polymer to cross-link the polymer.

Using a blocked prepolymer is not entirely satisfactory because of the reduced isocyanate content and when a prepolymer is used a greater amount of blocked prepolymer is required for cross-linking than is desirable.

It is an object of this invention to provide an isocyanate cross-linking agent for a solvent dispersible polymeric vehicle which polymeric vehicle is shelf stable and has a low cure temperature.

It is another object of this invention to provide a blocked isocyanate cross-linking agent which has a high isocyanate content, permits a low temperature cure as a part of a polymeric vehicle and does not adversely affect shelf stability as a part of a polymeric vehicle.

It is yet another object of this invention to provide a new inexpensive cross-linking agent and method for cross-linking polymers with polymers having an isocyanate reactive functionality.

These and other objects of the invention will be found by reference to the following description.

SUMMARY OF THE INVENTION

The invention provides a new cross-linking agent for polymers with an active hydrogen which is reactive with an isocyanate group (—N=C=O) which cross-linking agent comprises a blend of a blocked diisocyanate and blocked polyisocyanate. The blend has from about 20 to about 34 weight percent isocyanate groups available for cross-linking a polymer through an isocyanate reactive functionality, based upon the weight of the blend, with at least about 30 weight percent of the isocyanate groups being from the diisocyanate. Preferably, the blend has from about 26 to about 27 weight percent isocyanate groups available for reaction with and to cross-link a polymer. The blend is substantially free of urethane prepolymer in that it contains no more than from about 0 to about 2 weight percent urethane prepolymer which amounts are not more than a trace, or which would not materially affect the reactivity of the cross-linking agent.

A new method for making an isocyanate cross-linking agent also is contemplated as a part of the invention. The method for making the cross-linking agent includes blending and blocking a diisocyanate and polyisocyanate without making a urethane prepolymer such that the blend has from about 20 to about 34 weight percent isocyanate groups with at least about 30 weight percent isocyanate being from the diisocyanate.

In another aspect of the invention, the cross-linking agent provides a new method for cross-linking nonaqueous solvent dispersible polymers with active hydrogens which are reactive with isocyanate groups. In the method, the blend of blocked diisocyanate and blocked polyisocyanate having about 20 to about 34 weight percent isocyanate groups available for cross-linking a polymer, with at least about 30 weight percent isocyanate coming from the diisocyanates, is reacted with the polymer with active hydrogens to cross-link it. According to the method, polymers are cross-linked without the use of a urethane prepolymer cross-linking agent as heretofore used in the art.

The invention also contemplates a solvent dispersible polymeric vehicle, which when applied to a substrate, provides a coating binder. The polymeric vehicle comprises (1) a polymer having an active hydrogen reactive with an isocyanate and (2) the cross-linking agent which comprises the blend of blocked diisocyanates and polyisocyanates which is substantially free of urethane prepolymer. The polymeric vehicle may form a part of a high solids formulated coating composition which includes an organic solvent.

Because the cross-linking agent, the method of cross-linking and the polymeric vehicle of the invention are all substantially free of urethane prepolymer, a high isocyanate content which is available for cross-linking is achieved. This permits the use of less isocyanate in the cross-linking agent and polymeric vehicle with the retention of the same or more available isocyanate groups for cross-linking polymers reactive with them. This results in a cost savings with the use of less di- or polyisocyanate, elimination of the use of polyols in the urethane prepolymer and the elimination of the manufacture and use of a urethane prepolymer as an isocyanate cross-linking agent. Further, the use of the cross-linking agent of the invention as a part of a solvent dispersible polymeric vehicle permits low cure temperatures and provides coating binders with improved impact and salt spray resistance.

As used herein, diisocyanate means an isocyanate with two isocyanate groups. Polyisocyanate means an isocyanate with more than two isocyanate groups. Urethane prepolymer means the reaction product of a di- or polyisocyanate with a compound containing an active hydrogen reactive with an isocyanate which reaction product thereafter has reactive isocyanates blocked with blocking agents or is further reacted with a polymer through reactive isocyanates and active hydrogens.

As used in this application, "polymer" means a polymeric or oligomeric component of a polymeric vehicle such as a polyester polymer, alkyd polymers being considered to be a sub-class of polyester polymers. "Cross-linking agent" means a di- or polyfunctional substance containing isocyanate groups that are capable of forming covalent bonds with active hydrogens on polymers. "Active hydrogen" or "polymers with active hydrogens" are polymers with isocyanate reactive groups which include groups with hydrogen bonded to nitrogen such as amines and amides, alcohols and carboxylic acids. An important aspect of this invention includes cross-linking polyesters with hydroxyl functionality. "Polymeric vehicle" means all polymeric and resinous components in a formulated coating, i.e. before film formation, including but not limited to polymers and cross-linking agents. "Coating binder" means the polymeric part of the film of the coating after solvent has evaporated and after cross linking. "Formulated coating" means the polymeric vehicle and solvents, pigments, catalysts and additives which may optionally be added to impart desirable application characteristics to the formulated coating and desirable properties such as opacity and color to the film. "Film" is formed by application of the formulated coating to a base or substrate, evaporation of solvent and cross-linking.

DETAILED DESCRIPTION OF THE INVENTION

The cross-linking agent according to the invention is a blend of blocked diisocyanates and blocked polyisocyanates, which when deblocked as by heating, will provide an isocyanate content which is available for cross-linking in the range of from about 20 to about 34 weight percent isocyanate (—N═C═O), preferably from about 26 to about 27 weight percent isocyanate, with at least about 30 weight percent, and preferably at least about 40 weight percent, isocyanate content coming from the diisocyanate, blocked diisocyanate comprising from about 30 to about 90 weight percent of the blend. Diisocyanates which may be used in the invention include isophorone diisocyanate (IPDI), tetramethylxylene diisocyanate (TMXDI), hexamethylene diisocyanate (HMDI) and other aliphatic diisocyanates such as trimethylene diisocyanate, tetramethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate; cycloalkylene diisocyanates such as 1,3-cyclopentane-diisocyanate, 1,4-cyclohexane-diisocyanate and 1,3-cyclohexane-diisocyanate; and aromatic diisocyanates such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-tolulene diisocyanate.

The polyisocyanates may be dimerized or trimerized diisocyanates such as trimerized HMDI or IPDI and triisocyanates such as triphenylmethane-4,4',4''-triisocyanate, 1,3,5-triisocyanatobenzene, 1,3,5-triisocyanatocyclohexane, 2,4,6-triisocyanatotoluene and ω-isocyanatoethyl-2,6-diisocyanatocaproate; and tetraisocyanates, such as 4,4'-diphenyldimethylmethane-2,2',5,5'-tetraisocyanate.

In another aspect of the invention, blocked biurets (having a

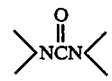

linkage and which have more than two reactive isocyanate groups) may be used as polyisocyanates. An important embodiment of this aspect hexamethylene diisocyanate (HMDI) which biuret has the structure

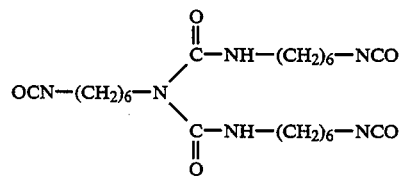

and is a trimerized product of hexamethylene diisocyanate and water. A blend of blocked TMXDI and blocked HMDI or HMDI biuret are important aspects of the invention.

Agents which block the isocyanate groups and "deblock" at elevated temperature are known and are used in the invention. These include oximes, lactams, imines, carbamates such as acetone oxime, methyl ethyl ketoxime, ε-caprolactam and ethyleneimine.

In the invention the diisocyanates and polyisocyanates are blended and then blocked in a suitable solvent such as methyl isoamyl ketone, at an elevated temperature below the deblocking temperature associated with the isocyanate and blocking agent. In general, this will be in a temperature range of from about 100° F. to about 200° F. An equivalent ratio of NCO/blocking agent in the range of about 1/1 is preferred. Free isocyanate content of the blend preferably will be less than 5 weight percent and preferably is less than 1 weight percent.

The polymeric vehicle of the invention is provided by combining cross-linking agent having the blend of blocked di- and polyisocyanates with polymers containing isocyanate reactive functionality. The amount of cross-linking agent in the polymeric vehicle is a function of isocyanate content in the cross-linking agent, the extent of isocyanate reactive functionality of the polymer and the reactivity of the isocyanate reactive functionality. The amount of cross-linking agent in the polymeric vehicle must be in an amount effective for cross-linking the polymer to provide a coating binder having a hardness of about 2H. In an important aspect of this invention, the polymeric vehicle includes a hydroxy containing polyester or polyester polyol having a hydroxyl value in the range of from about 30 to about 300 and a molecular weight in the range of from about 370 to about 4000. In this aspect of the invention the polymeric vehicle is a high solids resin systems with at least about 80 weight percent nonvolatiles and a viscosity in the range of from about Z1 to about Z5. In this aspect of the invention the ratio of polyester to cross-linking agent is in the range of from about 10/1 to about 1/1 and preferably from about 4/1 to about 2/1. Such a polymeric vehicle generally cross-links at a temperature range of from about 250° F. to about 350° F. in a period of about 30 to 10 minutes respectively.

The following examples set forth examples of the invention as well as comparative examples of other compositions.

CROSS-LINKING AGENTS

EXAMPLE I (Blocked TMXDI and Trimerized HMDI)

The following ingredients were charged into a reaction vessel

| Ingredient | Grams |
| --- | --- |
| Methyl Isoamyl Ketone (MIAK) | 150 |
| Desmodur N-3390* | 590.5 |
| TMXDI | 354.3 |
| MIAK | 135 |

*Desmodur N-3390 is a polyisocyanate which is a trimerized structure of hexamethylene diisocyanate commercially available from Mobay Corporation.

490 grams of methyl ethyl ketoxime (MEKO) was added into the reaction vessel in four additions over about two hours with cooling as necessary to 140° F. with further heating for about an hour to 170° F. Thereafter, the reaction mixture was cooled, filtered and exhibited the following properties:
Visc.—X+1 sec.
Color—<1
% NCO—<0.1
% NV—80.1
Wt./Gal.—8.76

EXAMPLE II (TMXDI blocked with MEKO)

| Ingredient | Eq. | Grams |
| --- | --- | --- |
| MIAK |  | 150 |
| TMXDI | 6.379 | 788 |
| MEKO | 6.379 | 555 |

The above ingredients were reacted by charging the methyl isoamyl ketone and TMXDI into a reaction vessel. Thereafter the methyl ethyl ketoxime (MEKO) was added over about fifty minutes with an exothermic reaction which was kept to 150° F. with cooling. After the addition of MEKO, the reaction mixture was heated to about 180° F. for one hour resulting in blocked TMXDI with the following properties.
Visc.—Z5—10 sec.
% NCO—<0.1
% NV—89.7
Color—<1
Comb. Wt.—235 as is
Wt./Gal.—8.82

EXAMPLE III (Blocked Polyisocyanate—Trimerized HMDI)

| Ingredient | Eq. | Grams |
| --- | --- | --- |
| MIAK |  | 209 |
| Des N-3390 | 4.224 | 915 |
| MEKO | 4.224 | 368 |

The above ingredients were reacted by charging the methyl isoamyl ketone and Des N-3390 into a reaction vessel. Thereafter, the methyl ethyl ketoxime was added in three portions over about one half hour with an exothermic reaction which was kept to 150° F. with cooling. Thereafter, the reaction mixture was heated to 180° F. for about ten minutes resulting in blocked trimerized HMDI with the following properties.
Visc.—22+2 sec.
% NCO—<0.1
% NV—79.7
Color—<1
Comb. Wt.—355 as is
Wt./Gal.—8.92

EXAMPLE IV

Comparisons—Prepolymer Cross-Linking Agents With The Invention

Example IV

Polymeric Vehicles

Polymeric vehicles A through I using a hydroxyl containing polyester were made with the cross-linking agents of Examples I through III The hydroxyl containing polyester was Resin No. 5776, commercially available from Cargill, Incorporated, Minneapolis, Minn., having 85% solids by weight, a viscosity of Z4 and a hydroxyl value of about 175 was blended with each of the cross linking agents as described below. Polymeric vehicles C and E-H are exemplary of the invention; polymeric vehicles A, B, D and I are comparative examples. The polymeric vehicles were mixed with the indicated cross-linking agent. The cross-linking agent in polymeric vehicle A comprises a HMDI biuret available as Des N-100 from Mobay Corporation and a blocked prepolymer of IPDI and polyol, the prepolymer being blocked with MEKO which is commercially available as product 5797 from Cargill, Incorporated, Minneapolis, Minneapolis, Minn. The cross-linking agent for polymeric vehicle D is TMXDI blocked with MEKO.

|  | A |
| --- | --- |
| Ingredients - Weight Ratio of Polyester:Cross-Linker - | Polyester + Blocked IPDI Prepolymer 47.4:52.6 |
| VOC (lbs./gal.) |  |
| Theoretical - | 3.00 |
| Actual - | 3.13 |
| Viscosity (#4 Zahn) - | 19" |

-continued

B

| | |
|---|---|
| Ingredients - | Polyester + Blocked TMXDI Prepolymer and Des N-100 |
| Weight Ratio of Polyester:Cross-Linker - | 47.5:52.5 |
| VOC (lbs./gal.) | |
| Theoretical - | 3.00 |
| Actual - | 3.24 |
| Viscosity (#4 Zahn) - | 19" |

C (Invention)

| | |
|---|---|
| Ingredients - | Polyester + Blocked TMXDI & Trimerized HMDI-Ex. I |
| Weight Ratio of Polyester:Cross-linker - | 56.5:43.5 |
| VOC (lbs./gal.) | |
| Theoretical - | 3.00 |
| Actual - | 3.24 |
| Viscosity (#4 Zahn) - | 19" |

D

| | |
|---|---|
| Ingredients - | Polyester + MEKO Blocked TMXDI |
| Weight Ratio of Polyester:Cross-linker - | 60.3:39.7 |
| VOC (lbs./gal.) | |
| Theoretical - | 2.75 |
| Actual - | 3.16 |
| Viscosity (#4 Zahn) - | 17" |

E (Invention)

| | | | |
|---|---|---|---|
| Ingredients - | Polyester + | MEKO Blocked TMXDI-Ex. II + | MEKO Blocked Trimerized HMDI-Ex.-III |
| Weight Ratio of Polyester:Cross-linker- | 58.7: | 30.9: | 10.4 |
| VOC (lbs./gal.) | | | |
| Theoretical - | 2.75 | | |
| Actual - | 3.25 | | |
| Viscosity (#4 Zahn) - | 13" | | |

F (Invention)

| | | | |
|---|---|---|---|
| Ingredients - | Polyester + | Ex. II + | Ex. III |
| Weight Ratio of Polyester:Cross-linker - | 57.2: | 22.6: | 20.2 |
| VOC (lbs./gal.) | | | |
| Theoretical - | 2.75 | | |
| Actual - | 3.09 | | |
| Viscosity (#4 Zahn) - | 18" | | |

G (Invention)

| | | | |
|---|---|---|---|
| Ingredients - | Polyester + | Ex.-II + | Ex.-III |
| Weight Ratio of Polyester:Cross-linker - | 55.7: | 14.7: | 29.6 |
| VOC (lbs./gal.) | | | |
| Theoretical - | 2.75 | | |
| Actual - | 3.15 | | |
| Viscosity (#4 Zahn) - | 17" | | |

H (Invention)

| | | | |
|---|---|---|---|
| Ingredients - | Polyester + | Ex.-II + | Ex.-III |
| Weight Ratio of Polyester:Cross-linker - | 54.4: | 7.2: | 38.4 |
| VOC (lbs./gal.) | | | |
| Theoretical - | 2.86 | | |
| Actual - | 3.03 | | |
| Viscosity (#4 Zahn) - | 18" | | |

I

| | | |
|---|---|---|
| Ingredients - | Polyester + | Ex.-III |
| Weight Ratio of Polyester:Cross-linker - | 53.1: | 46.9 |
| VOC (lbs./gal.) | | |
| Theoretical - | 2.88 | |
| Actual - | 2.96 | |
| Viscosity (#4 Zahn) - | 19" | |

Properties Of Coating Binders From Polymeric Vehicles A Through I

Polymeric vehicles A through I were cast on steel panels and baked for 20 minutes at 320° F. After baking the coating binders A through I the panels exhibited the properties shown below.

| Property | A | B | C | D | E | F | G | H | I |
|---|---|---|---|---|---|---|---|---|---|
| Pencil Hardness | 2H | 2H | 2H | 2H | 2H | 2H | 2H | 2H | 2H |

-continued

| Property | A | B | C | D | E | F | G | H | I |
|---|---|---|---|---|---|---|---|---|---|
| Impact D/R: | 160/160 | 160/140 | 160/160 | 160/05 | 160/15 | 160/160 | 160/160 | 160/160 | 160/160 |
| Adhesion CRS: | 100% | 100% | 100% | 100% | 100% | 100% | 100% | 100% | 100% |
| Salt Spray- 193 Hrs: | | | | | | | | | |
| Scribe Creep: | 1/4" | 1/4" | 7/16" | 1/4" | 1/4" | 5/16" | 5/16" | 3/4" | 3/4" |
| Scribe Blisters: | MOD #6-8 | MOD #8 | MOD #6-8 | MOD #8 | MOD #8 | SL-MOD #8 | SL-MOD #8 | SL-MOD #8 | SL-MOD #8 |
| Scribe Corrosion: | MOD | MOD | MOD | MOD | MOD | MOD | MOD | MOD | MOD |
| Surface Blisters | None | None | None | None | None | None | None | None | None |
| Surface Corrosion: | None | None | None | None | None | None | None | None | None |
| Humidity- 308 Hrs: | None | None | None | None | None | None | None | None | None |
| QUV Durability: | | | | | | | | | |
| UVB 313 (60/20): | | | | | | | | | |
| Initial: | 91/73 | 94/88 | 90/68 | 95/86 | 94/83 | 93/80 | 93/77 | 92/72 | 91/73 |
| 120 Hours: | 83/52 | 90/76 | 81/43 | 92/79 | 91/79 | 89/72 | 87/65 | 86/60 | 85/61 |
| 308 Hours: | 74/33 | 87/58 | 71/26 | 71/24 | 83/47 | 90/68 | 87/59 | 84/50 | 78/40 |
| 616 Hours: | 56/12 | 71/33 | 63/15 | 35/00 | 60/17 | 74/34 | 75/35 | 73/29 | 70/26 |
| 833 Hours: | 41/01 | 50/08 | 48/04 | 16/00 | 33/02 | 52/06 | 57/12 | 55/09 | 58/13 |
| 944 Hours: | 32/00 | 37/00 | 42/02 | 14/00 | 28/00 | 43/00 | 50/08 | 49/05 | 50/06 |
| 1134 Hours: | 25/00 | 28/00 | 29/00 | 10/00 | 21/00 | 33/00 | 38/00 | 34/00 | 36/00 |

The ability of the polymeric vehicles A through I to cure at low temperatures was tested by casting the polymeric vehicle on steel panels and determining the time and temperature for the curing required to permit the coating binder to withstand 100 rubs with methyl ethyl ketone. The results are shown below.

| | Amount of Time it Takes to Pass 100 MEK Rubs (minutes) | | | | | | | | |
|---|---|---|---|---|---|---|---|---|---|
| Temperature (F) | A | B | C | D | E | F | G | H | I |
| 250 | — | — | — | — | 30 | — | — | — | — |
| 260 | — | 30 | — | 30 | 30 | — | — | — | — |
| 270 | 27 | 25 | 27 | 25 | 15 | 25 | 27 | 27 | 27 |
| 280 | 20 | 15 | 17 | 15 | 12 | 20 | 20 | 20 | 20 |
| 290 | 17 | 12 | 17 | 12 | 10 | 17 | 17 | 17 | 14 |

Although the invention has been described with regard to its important features and preferred embodiments, it should be understood that various changes and modifications as would be obvious to one having ordinary skill in this art may be made without departing from the scope of the invention which is set forth in the claims appended hereto.

The various features of this invention which are believed to be new art set forth in the following claims.

What is claimed is:

1. A solvent dispersible polymeric vehicle comprising:
   a polyester polymer having a hydroxyl group with an active hydrogen reactive with an isocyanate group, the polymer having a hydroxyl value in the range of from about 30 to about 300 and a molecular weight in the range of from about 370 to about 4,000; and
   a cross-linking agent comprising a blend of a blocked diisocyanate compound and a blocked polyisocyanate compound, the diisocyanate compound and the polyisocyanate compound having isocyanate groups which have been blocked by a blocking agent, the blend having from about 20 to about 34 weight percent isocyanate groups available for reaction with the polymer after deblocking with at least about 30 percent isocyanate groups in the cross-linking agent being from the diisocyanate compound, the polyisocyanate compound having more than two isocyanate groups, the blend being substantially free of a blocked urethane prepolymer, the polymer and cross-linking agent being in a ratio in the range of from about 10/1 to about 1/1 polymer to cross-linking agent.

2. A solvent dispersible polymeric vehicle as recited in claim 1 wherein the polymer and the cross-linking agent are in a ratio in the range of from about 4/1 to about 2/1 polymer to cross-linking agent.

3. A solvent dispersible polymeric vehicle as recited in claim 1 wherein the blend comprises from about 30 to about 90 weight percent blocked diisocyanate compound.

4. A solvent dispersible polymeric vehicle as recited in claims 1 or 3 wherein the diisocyanate compound is tetramethylxylene diisocyanate and the polyisocyanate compound is trimerized hexamethylene diisocyanate or a biuret of hexamethylene diisocyanate.

5. A solvent dispersible polymeric vehicle as recited in claims 1 or 3 wherein the blend has from about 26 to about 27 weight percent isocyanate groups available for reaction with the polymer after deblocking.

6. A solvent dispersible polymeric vehicle as recited in claim 4 wherein the blend has from about 26 to about 27 weight percent isocyanate groups available for reaction with the polymer after deblocking.

7. A solvent dispersible polymeric vehicle as recited in claims 2 or 3 wherein the diisocyanate compound is selected from the group consisting of isophorone diisocyanate, tetramethylxylene diisocyanate, hexamethylene diisocyanate, trimethylene diisocyanate, tetramethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, 1,3-cyclopentane-diisocyanate, 1,4-cyclohexane-diisocyanate, 1,3-cyclohexane-diisocyanate, m-phenylene diisocyanate, p-phenylene diisocyanate, 4,4'-diphenyldiisocyanate, 1,5-naphthalene diisocyanate, 4,4'-diphenylmethane diisocyanate and 2,4- or 2,6-toluene diisocyanate and the polyisocyanate compound is selected from the group consisting of trimerized hexamethylene diisocyanate, a biuret of hexamethylene diisocyanate, trimerized isophronone diisocyanate, triphenylmethane-4,4',4"-triisocyanate, 1,3,5-triisocyanatobenzene, 1,3,5-triisocyanatocyclohexane, 2,4,6-triisocyanatotoluene, ω-isocyanatoethyl-2,6-diisocyanatocaproate, 4,4'-diphenyldimethylmethane-2,2',5,5'-tetraisocyanate.

8. A solvent dispersible polymeric vehicle as recited in claims 1 or 3 wherein the polyisocyanate is a tetraisocyanate.

9. A solvent dispersible polymeric vehicle as recited in claims 1 or 3 wherein the polyisocyanate is a biuret.

10. A solvent dispersible polymeric vehicle as recited in claims 1 or 3 wherein the polyisocyanate is a trimerized diisocyanate.

* * * * *